(12) United States Patent
Gross et al.

(10) Patent No.: US 12,510,083 B2
(45) Date of Patent: Dec. 30, 2025

(54) HIGH SPEED COOLANT PUMP

(71) Applicant: MAHLE INTERNATIONAL GMBH, Stuttgart (DE)

(72) Inventors: Martin Gross, Kämpfelbach (DE); Uwe Aschermann, Karlsruhe (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 251 days.

(21) Appl. No.: 18/406,926

(22) Filed: Jan. 8, 2024

(65) Prior Publication Data

US 2024/0229818 A1 Jul. 11, 2024

(30) Foreign Application Priority Data

Jan. 10, 2023 (DE) .......................... 102023200131.4

(51) Int. Cl.
*F04D 17/00* (2006.01)
*B60L 58/33* (2019.01)
*F01P 5/12* (2006.01)
*F04D 29/58* (2006.01)

(52) U.S. Cl.
CPC .......... *F04D 17/00* (2013.01); *F04D 29/588* (2013.01); *B60L 58/33* (2019.02); *F01P 5/12* (2013.01); *F04B 2207/0411* (2013.01); *F04B 2207/0421* (2013.01)

(58) Field of Classification Search
CPC .............. B60L 58/33; F04B 2207/0421; F04B 2207/0411; F01P 5/12; F04D 13/08; F04D 29/588; F04D 17/00
See application file for complete search history.

(56) References Cited

U.S. PATENT DOCUMENTS

| 6,612,815 | B2 * | 9/2003 | Pawellek | .............. F04D 29/588 |
| | | | | 310/87 |
| 11,005,329 | B2 | 5/2021 | Tolksdorf | |
| 12,305,648 | B2 * | 5/2025 | Yang | ..................... F04D 29/426 |
| 12,392,355 | B2 * | 8/2025 | Gross | .................. F04D 29/5806 |
| 2023/0220846 | A1 * | 7/2023 | Yang | ..................... F04D 29/026 |
| | | | | 417/423.14 |
| 2024/0229825 | A1 * | 7/2024 | Gross | .................. F04D 29/5806 |

FOREIGN PATENT DOCUMENTS

| CN | 203722413 | | 7/2014 |
| CN | 108286523 | | 7/2018 |
| DE | 8813030 | U1 | 12/1988 |
| DE | 102018126775 | | 4/2020 |

OTHER PUBLICATIONS

Grundfos Data Booklet, SP Submersible pumps, motors, and accessories (North America, 60Hz) (Year: 2020).*
Office Action dated Apr. 11, 2025 for U.S. Appl. No. 18/406,685.

\* cited by examiner

*Primary Examiner* — Nathan C Zollinger
(74) *Attorney, Agent, or Firm* — Barnes & Thornburg LLP

(57) ABSTRACT

The invention relates to a fluid pump that has an electric motor with a shaft and an impeller with an outer diameter, that is connected to the shaft for conjoint rotation. A maximum volumetric flow and a maximum pressure difference (dp) can be generated in the fluid pump by the rotating impeller. A characteristic index number (K) for the fluid pump is greater than 350 kW/m². The index number (K) corresponds to the product of the maximum volumetric flow and the maximum pressure difference in the fluid pump divided by the square of the outer diameter of the impeller.

15 Claims, 3 Drawing Sheets

HIGH SPEED COOLANT PUMP

CROSS-REFERENCE TO RELATED APPLICATIONS

This application claims priority from German Patent Application No. DE 10 2023 200 131.4, filed Jan. 10, 2023, the entirety of which is hereby fully incorporated by reference herein.

The invention relates to a fluid pump for coolant according to the preamble of claim 1.

An electric high-voltage fluid pump can be used to cool a fuel cell system that contains at least one fuel cell stack composed of numerous fuel cells in a motor vehicle powered with fuel cells. The fluid pump contains an electric motor and an impeller powered by the motor with which fluids are conveyed. An electronics system containing high-power components is used to control or regulate the fluid pump. The electric motor and the electronics require an effective cooling because of the high-powered hydraulics or electronics.

The object of the invention is therefore to create a better, or at least alternative, design for this type of fluid pump that overcomes these disadvantages.

This problem is solved with the invention by the subject matter of independent claim 1. Advantageous embodiments are the subject matter of the dependent claims.

The basis for the present invention is the general idea of creating an effective cooling concept for the electric motors and electronics in fluid pumps, while reducing the installation space, weight, and costs of the fluid pump.

The fluid pump according to the invention is designed for conveying coolant. This fluid pump can be operated with high voltages, preferably between 400V and 900V. In particular, the fluid pump can be designed for cooling a fuel cell system containing at least one stack of fuel cells comprising numerous fuel cells in a motor vehicle powered with fuel cells.

The fluid pump contains an electric motor that has a shaft rotating about a rotational axis and an impeller with an outer diameter. The impeller is connected to the shaft for conjoint rotation and therefore rotates about the same rotational axis. A maximum volumetric flow and maximum pressure difference in the fluid pump can be generated with the rotating impeller. According to the invention, a characteristic index value for the fluid pump at the design point is greater than 350 kW/m². The index value corresponds to the product of the maximum volumetric flow and maximum pressure difference in the fluid pump divided by the square of the outer diameter of the impeller. The design point for the fluid pump is therefore defined by the operating point for the fluid pump at which the fluid pump exhibits its maximum efficiency.

In other words, the following equation defines the index value K:

$$K = \frac{\dot{V}dp}{d^2} > 350 \ \frac{kW}{m^2}$$

where $\dot{V}$ is the maximum volumetric flow in the fluid pump, dp is the maximum pressure difference in the fluid pump, and d is the outer diameter of the impeller.

The outer diameter of the impeller can be less than 90 mm, preferably less than 80 mm. The outer diameter of the impeller can be greater than 40 mm, preferably greater than 50 mm. In other words, the outer diameter of the impeller can be between 40 mm and 90 mm, preferably between 50 mm and 80 mm.

The maximum pressure difference in the fluid pump can be between 3 bar and 4 bar, preferably 3.5 bar, at the design point. The maximum volumetric flow in the fluid pump at the design point can be between 450 l/min and 550 l/min, preferably 500 l/min. The maximum rotational rate of the impeller can be between 6,900 rpm and 7,900 rpm, preferably 7,400 rpm at the design point of the fluid pump. The maximum torque for the fluid pump can be between 5.0 Nm and 6.5 Nm, preferably 5.7 Nm, at the design point of the fluid pump. The maximum efficiency of the fluid pump can be between 45% and 55% at the design point of the fluid pump. The maximum efficiency of the electric motor can be between 90% and 92%. The maximum efficiency of the fluid pump in the hydraulic range can be between 60% and 70%.

The fluid pump contains the aforementioned electric motor with the rotating shaft. The motor can contain a stator with stator windings and a laminated core for the stator coils. The motor can also have a rotor with numerous permanent magnets and a laminated rotor core on which the permanent magnets are supported, with the rotor attached to the rotating shaft for conjoint rotation. The rotor can be placed with the shaft in the stator, supported by two bearings such that it can rotate therein. An alternating electromagnetic field can be generated in the stator coils. A voltage can be applied to the stator coils by an inverter in the motor. The alternating electromagnetic field can then interact with the magnetic field of the permanent magnets such that the rotor is rotated with the shaft, thus driving the impeller.

The outer diameter of the impeller can be reduced with the aforementioned index number, and the rotational rate of the impeller, or fluid pump, can be increased, thus lowering the torque. Consequently, the losses from the difficult-to-cool stator coils can be transferred to the easily cooled stator laminated core and the easily cooled bearings in the motor. This also reduces the losses in the electronics for the fluid pump and the increases the cooling effect.

Other features and advantages of the invention can be derived from the dependent claims, the drawings, and the descriptions of the drawings.

It should be clear that the features described above and explained below can be used not only in the given combinations, but also in other combinations or in and of themselves, without abandoning the scope of the present invention.

Preferred exemplary embodiments of the invention are shown in the drawings and shall be explained below in greater detail, in which the same reference symbols are used for the same or similar, or functionally similar components.

Therein, schematically:

Figure 1:
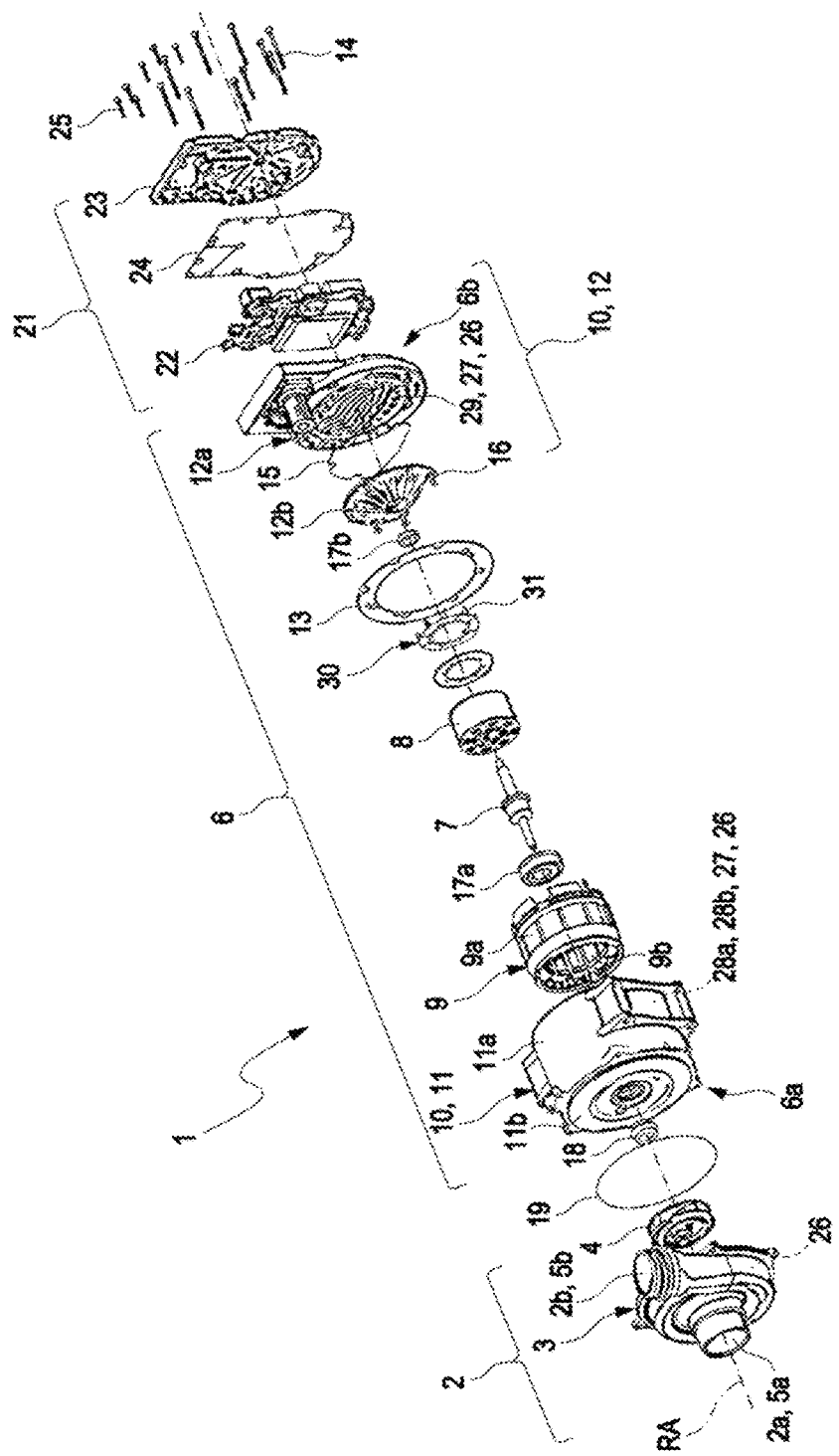
FIG. 1 shows an exploded view of a fluid pump according to the invention.

FIG. 1 shows an exploded view of a fluid pump 1 according to the invention. The fluid pump is intended or designed to convey coolant for a fuel cell system containing at least one stack of fuel cells comprising numerous fuel cells in a motor vehicle powered by fuel cells. The fluid pump 1 contains an impeller unit 2 comprising an impeller housing 3 and an impeller 4. The impeller unit 2 has an intake end 2a, or low-pressure end, which has a fluid intake 5a, and an outlet end 2b, or high-pressure end, which has a fluid outlet 5b. The intake end 2a and outlet end 2b are separated by the impeller 4, with which a fluid connection can be obtained between them. The fluid intake 5a and fluid outlet 5b are formed in the impeller housing 3.

The fluid pump 1 also has an electric motor 6. The electric motor 6 can be a permanent magnet synchronous motor in particular. The motor 6 comprises a shaft 7 that can rotate about a rotational axis RA, a rotor 8 permanently attached to the shaft 7, and a stator 9 in which the rotor 8 is received. The stator 9 comprises a laminated core 9a and numerous stator windings 9b. The laminated core 9a forms a hollow cylinder and the stator windings 9b are distributed about the rotational axis RA within the laminated core 9a. The shaft 7 is connected to the impeller for conjoint rotation, such that the impeller 4 rotates with the shaft 7 about the rotational axis RA. The motor 6 has two opposing ends 6a and 6b in relation to the rotational axis RA. The impeller unit 2 is located at one end 6a of the motor 6.

The motor 6 has a motor housing 10 formed by a cup-shaped body 11 with a lid 12 that is transverse to the rotational axis RA. The motor housing 10 also has a seal 13 that is clamped between the body 11 and the lid 12, that seals against the exterior. The body 11 and lid 12 are held together by numerous threaded fasteners 14. The body 11 has a wall 11a that encompasses the rotational axis RA and a base 11b that is transverse to the rotational axis RA. The base 11b separates the impeller 4 from the rotor 8 and stator 9 with regard to fluids that could otherwise flow therebetween. The lid 12 has a base plate 12a and a cover plate 12b covers the base plate 12a where it faces toward the stator, rotor, and impeller. There is a seal 15 clamped between the base plate 12a and the cover plate 12b, which seals against the exterior. The base plate 12a and cover plate 12b are held together by numerous threaded fasteners 16.

The stator 9 is stationary inside the motor housing 10, and the shaft 7 can rotate with the rotor 8 in the motor housing 10, and therefore in the stator 9. The fluid pump 1 has two bearings 17a and 17b for this, which support the shaft at the two ends 6a and 6b of the motor 6 such that it can rotate. There is also a shaft seal 18 on the shaft 7 at the first end 6a. The fluid pump 1 also has an O-ring seal 19. The O-ring seal 19 is clamped between the motor housing 10 and the impeller housing 3, and seals against the exterior.

The fluid pump 1 also contains an inverter 21 with which electricity is supplied to the motor 6. The inverter 21 can convert DC voltages between 400 V and 900 V. The inverter is located on the lid 12 at the second end 6b of the motor 6. The inverter 21 comprises a control circuit board 22 and an inverter lid 23, with the control circuit board 22 being between the lid 12, or base plate 12a of the motor housing 10, and the inverter lid 23, facing away from the impeller unit 2, or outside thereof. The inverter 21 also has a seal 24 clamped between the lid 12, or base plate 12a, and the inverter lid 23, which seals against the exterior. The lid 12, or base plate 12, and the inverter lid 23 are held together by numerous threaded fasteners 25.

The fluid pump 1 is designed to convey coolant. The fluid pump 1 has a channel 26 for this that passes through the impeller 4 from the fluid intake 5a at the intake end 2a to the fluid outlet 5b at the outlet end 2b. Parts of this channel 26 are also formed by cooling sleeve 27 in the motor housing 10. The cooling sleeve 27 comprises numerous—seven in this case—forward channels 28a and a return channel 28a in the wall of the housing 11a and a meandering or mazelike connecting channel 29 formed in the lid 12 between the base plate 12a and the cover plate 12b. The cooling sleeve 27 is delimited toward the exterior by the motor housing 10, and the coolant does not come in direct contact with the rotor 8 of the stator 9. The coolant itself can be dielectric.

The fluid pump also has a radial fan 30 facing away from the impeller 4 on the rotor 8. The radial fan 30 conveys air through the motor 6, or the stator 9. The radial fan 30 has numerous blades 31 that cause the air to move when the rotor rotates, thus cooling the rotor 8 and the stator 9.

The fluid pump 1 is designed such that a characteristic index number K for the fluid pump 1 is greater than 350 kW/m². The characteristic index number K corresponds to the product of the maximum volumetric flow V and the maximum pressure difference dp in the fluid pump divided by the square of the outer diameter d of the impeller 4. Mathematically, this is expressed as:

$$K = \frac{\dot{V}dp}{d^2} > 350 \; \frac{kW}{m^2}$$

The outer diameter d of the impeller 4 can be 40-90 mm, preferably 50-80 mm. The maximum pressure difference in the fluid pump 1 can be 3-4 bar, preferably 3.5 bar at the design point of the fluid pump 1. The maximum volumetric flow V in the fluid pump 1 can be between 450 l/min and 550 l/min, preferably 500 l/min at the design point of the fluid pump 1. The maximum rotational rate of the impeller 4 can be between 6,900-7,900 rpm, preferably 7,400 rpm, at the design point of the fluid pump 1. The maximum torque of the fluid pump 1 can be 5.0-6.5 Nm, preferably 5.7 Nm, at the design point of the fluid pump 1. The maximum efficiency of the fluid pump 1 can be 45-55%. The fluid pump can be powered with a voltage of 400-900 Volts.

Figure 2:
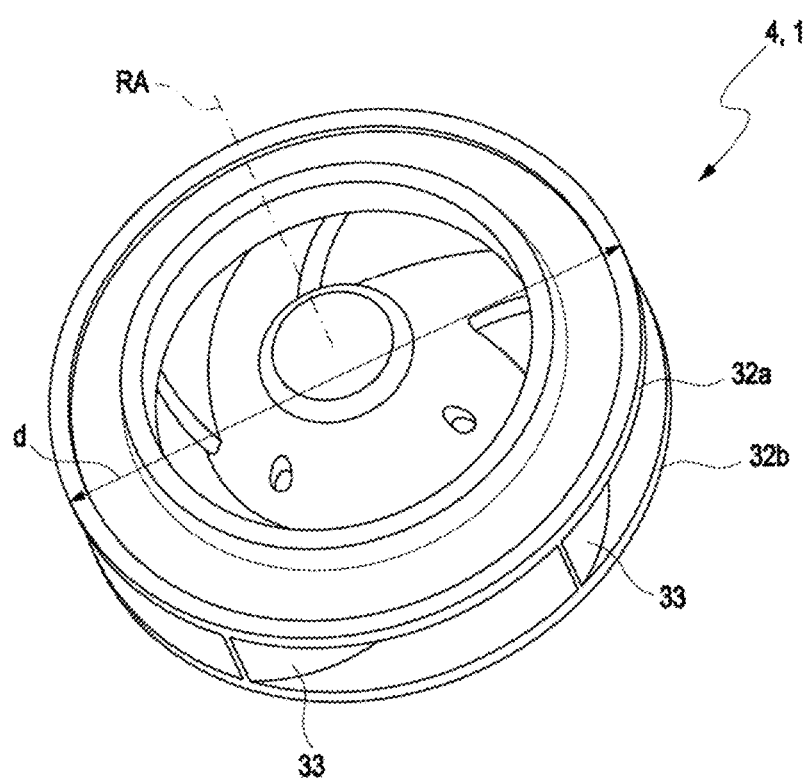
FIG. 2 shows an impeller in the fluid pump according to the invention.

FIG. 2 shows the impeller 4 in the fluid pump 1 according to the invention. The impeller 4 has a first ring 32a, second ring 32b, and numerous blades 33 therebetween. The impeller 4 is connected to the shaft 7 for conjoint rotation, and rotates with the shaft 7 about the rotational axis RA.

Figure 3:
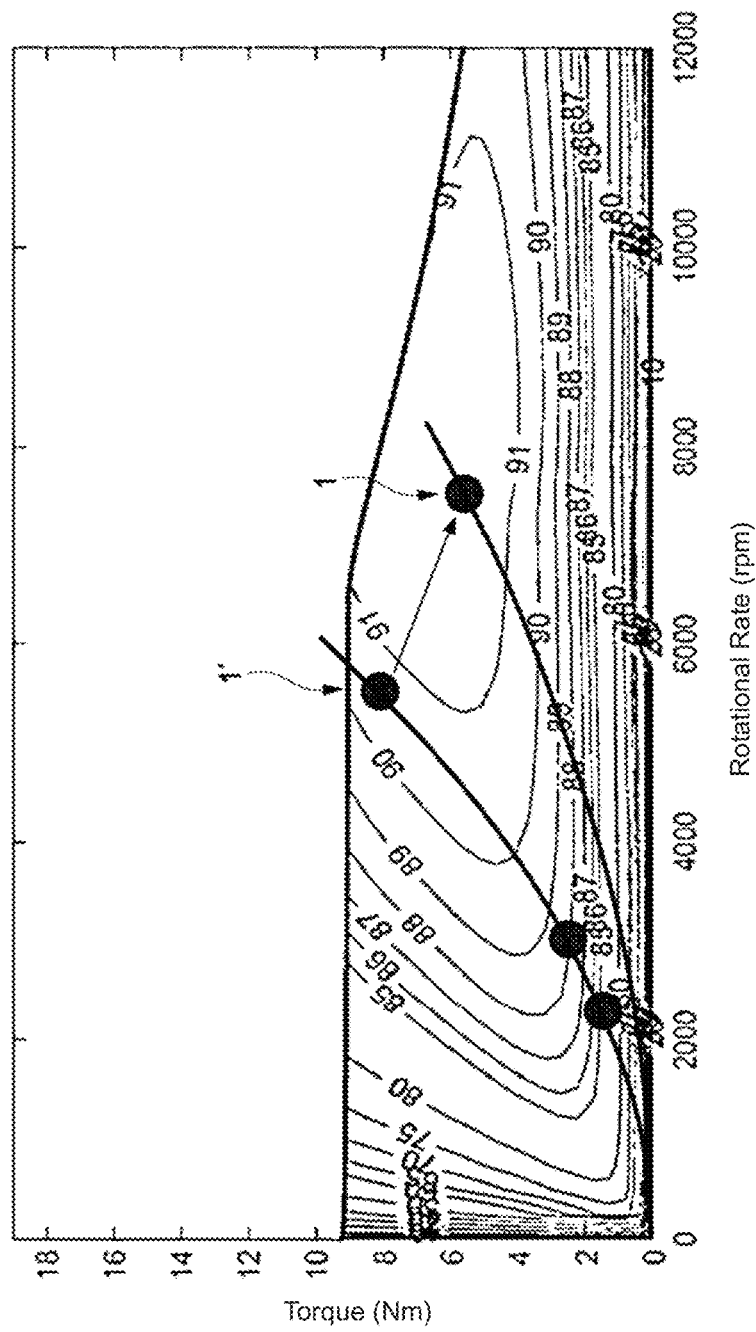
FIG. 3 shows a graph plotting the relationship of the rotational rate to the torque for the fluid pump according to the invention and a conventional fluid pump.

FIG. 3 shows a graph plotting the relationship between the rotational rate and the torque for the fluid pump 1 according to the invention and a conventional fluid pump 1'. This shows the torque as a function of the rotational rate. The efficiency is also indicated by the contour lines.

The fluid pump 1 and conventional fluid pump 1' are identical, aside from the impeller 4. The outer diameter d' of the impeller in the conventional fluid pump 1' is 100 mm, while the outer diameter d of the impeller 4 in the fluid pump 1 is 80 mm. The outer diameter d of the impeller 4 in the fluid pump 1 is therefore 20 mm smaller than in the conventional fluid pump 1'.

At the maximum volumetric flow $\dot{V}$ of 500 l/min and the maximum pressure difference of 3.5 bar, the characteristic index number K for the fluid pump 1 at the design point is 456 kW/m², and the characteristic index number K for the fluid pump 1' at the design point is 292 KW/t².

The electric motor 6 in the fluid pump 1 has an efficiency of 92% at the maximum torque and maximum rotational rate. The electric motor 6 in the conventional fluid pump 1' has an efficiency of 90.5% at the maximum torque and maximum rotational rate. The current in the fluid pump 1 can be reduced by 30% from that in the conventional fluid pump 1'. Moreover, the losses in the stator windings 9b are reduced by 50%, and in the control circuit board 22 by 30%. This increases the efficiency of the impeller 4 and the fluid pump 1 over that of the conventional fluid pump 1'. Furthermore, the losses from the difficult-to-cool stator windings 9b in the stator 9 are transferred to the easily cooled laminated core 9*a* in the stator 9, and the easily cooled bearings 17*a* and 17*b* in the motor 6. This increases the overall cooling effect for the motor 6.

The specification can be readily understood with reference to the following Numbered Paragraphs:

Numbered Paragraph 1. A fluid pump (1) for conveying fluids,
    wherein the fluid pump (1) contains an electric motor (6) with a shaft (7) that rotates about a rotational axis (RA), and an impeller (4) with an outer diameter (d),
    wherein the impeller (4) is connected to the shaft (7) for conjoint rotation, and can rotate with the shaft (7) about the rotational axis (RA),
    wherein a maximum volumetric flow (V̇) and a maximum pressure difference (dp) for the fluid pump (1) can be generated,
    characterized in that a characteristic index number (K) for the fluid pump (1), which corresponds to the product of the maximum volumetric flow (V̇) and the maximum pressure difference (dp) in the fluid pump (1) divided by the square of the outer diameter (d) of the impeller (4), is greater than 350 KW/$^2$ at the design point for the fluid pump (1).

Numbered Paragraph 2. The fluid pump according to Numbered Paragraph 1, characterized in that the outer diameter (d) of the impeller (4) is less than 90 mm, preferably less than 80 mm.

Numbered Paragraph 3. The fluid pump according to Numbered Paragraph 1 or 2, characterized in that the outer diameter (d) of the impeller (4) is greater than 40 mm, preferably greater than 50 mm.

Numbered Paragraph 4. The fluid pump according to any of the preceding Numbered Paragraphs, characterized in that the maximum pressure difference (dp) in the fluid pump (1) is between 3 bar and 4 bar, preferably 3.5 bar, at the design point of the fluid pump (1).

Numbered Paragraph 5. The fluid pump according to any of the preceding Numbered Paragraphs, characterized in that the maximum volumetric flow (V̇) in the fluid pump (1) is between 450 l/min and 550 l/min, preferably 500 l/min at the design point of the fluid pump (1).

Numbered Paragraph 6. The fluid pump according to any of the preceding Numbered Paragraphs, characterized in that the maximum rotational rate of the impeller (4) is between 6,900 rpm and 7,900 rpm, preferably 7,400 rpm, at the design point of the fluid pump (1).

Numbered Paragraph 7. The fluid pump according to any of the preceding Numbered Paragraphs, characterized in that the maximum torque in the fluid pump (1) is between 5.0 Nm and 6.5 Nm, preferably 5.7 Nm, at the design point of the fluid pump (1).

Numbered Paragraph 8. The fluid pump according to any of the preceding Numbered Paragraphs, characterized in that the maximum efficiency of the fluid pump (1) is between 45% and 55% at the design point of the fluid pump (1).

Numbered Paragraph 9. The fluid pump according to any of the preceding Numbered Paragraphs, characterized in that the fluid pump (1) is designed to be operated with high voltages, preferably between 400 V and 900 V.

Numbered Paragraph 10. The fluid pump according to any of the preceding Numbered Paragraphs, characterized in that the fluid pump (1) is designed for cooling a fuel cell system containing at least one stack of fuel cells comprising numerous fuel cells in a motor vehicle powered by fuel cells.

The invention claimed is:

1. A fluid pump for conveying fluids,
    the fluid pump comprises an electric motor with a shaft that rotates about a rotational axis (RA), and an impeller with an outer diameter, the impeller is connected to the shaft for conjoint rotation, and is configured to rotate with the shaft about the rotational axis (RA),
    wherein a maximum volumetric flow and a maximum pressure difference for the fluid pump can be generated,
    wherein the fluid pump is configured such that a characteristic index number (K) for the fluid pump, which corresponds to the product of the maximum volumetric flow and the maximum pressure difference in the fluid pump divided by the square of the outer diameter of the impeller is greater than 350 kW/m$^2$ at the design point of the fluid pump,
    wherein the maximum rotational rate of the impeller is between 6,900 rpm and 7,900 rpm at the design point of the fluid pump.

2. The fluid pump according to claim 1, wherein the outer diameter of the impeller is less than 90 mm.

3. The fluid pump according to claim 1, wherein the outer diameter of the impeller is greater than 40 mm.

4. The fluid pump according to claim 1, wherein the maximum pressure difference in the fluid pump is between 3 bar and 4 bar at the design point of the fluid pump.

5. The fluid pump according to claim 1, wherein the maximum volumetric flow (V̇) in the fluid pump is between 450 l/min and 550 l/min at the design point of the fluid pump.

6. The fluid pump according to claim 1, wherein the maximum torque in the fluid pump is between 5.0 Nm and 6.5 Nm at the design point of the fluid pump.

7. The fluid pump according to claim 1, wherein the maximum efficiency of the fluid pump is between 45% and 55% at the design point of the fluid pump.

8. The fluid pump according to claim 1, wherein the fluid pump is designed to be operated with voltages between 400 V and 900 V.

9. The fluid pump according to claim 1, wherein the fluid pump is designed for cooling a fuel cell system containing at least one stack of fuel cells comprising a plurality of fuel cells in a motor vehicle powered by fuel cells.

10. The fluid pump according to claim 2, wherein the outer diameter of the impeller is less than 80 mm.

11. The fluid pump according to claim 3, wherein the outer diameter of the impeller is greater than 50 mm.

12. The fluid pump according to claim 4, wherein the maximum pressure difference in the fluid pump is 3.5 bar, at the design point of the fluid pump.

13. The fluid pump according to claim 5, wherein the maximum volumetric flow in the fluid pump is 500 l/min at the design point of the fluid pump.

14. The fluid pump according to claim 6, wherein the maximum rotational rate of the impeller is 7,400 rpm at the design point of the fluid pump.

15. The fluid pump according to claim 6, wherein the maximum torque in the fluid pump is 5.7 Nm at the design point of the fluid pump.

\* \* \* \* \*